Patented June 1, 1948

2,442,538

UNITED STATES PATENT OFFICE 2,442,538

MARGARINE OIL PRODUCTION

Andrew Doyle Abbott, Fairfax, Calif., assignor to The Procter & Gamble Company, Cincinnati, Ohio, a corporation of Ohio No Drawing. Application January 22, 1947,
Serial No. 723,662

6 Claims. (Cl. 260—409)

This invention relates to a process for the treatment of glyceride fats for use in edible products, and more particularly to a process for the treatment of predominantly unsaturated oils for use as a base stock in the manufacture of margarine.

In application Serial No. 657,341, filed March 26, 1946, by Eddy W. Eckey, there is described and claimed a process for directing the rearrangement of fatty acid radicals in glycerides so as to produce products comprised of mixed triglycerides, e. g. triglycerides containing combined saturated and unsaturated fatty acids in the same molecule.

The present invention is designed to describe and claim a practical application of the above process in the manufacture of a base stock for margarine production.

I have discovered that if predominantly unsaturated oils, as more fully hereinafter defined, are first subjected to the process of directed interesterification above referred to, then partially hydrogenated under controlled conditions, the product is eminently suitable as a base stock for the production of margarine products which are superior in spreading qualities at icebox temperatures (around 50° F.), yet possessing desirably firm consistency at 70 to 90° F.

With regard to the interesterification step of the process, it is desirable to point out that the interesterification reaction is conducted by first bringing a low temperature interesterification catalyst into contact with the predominantly unsaturated oil, glyceride crystals consisting predominantly of disaturated-monounsaturated triglycerides being present at substantially the beginning of interesterification, and thereafter permitting the reaction to take place at a temperature within the range of which the lower limit is the lowest temperature at which a portion of the triglyceride is liquid and the upper limit is the highest temperature at which disaturated-monounsaturated triglycerides can crystallize from the liquid phase as the same are formed on interesterification. Thus this step of the process promotes the preferential formation and crystallization during interesterification of solid glycerides which have lower melting points than those trisaturated triglycerides that would ordinarily crystallize without such control.

For example, if a fat such as cottonseed oil, soybean oil, corn oil or the like is cooled before interesterification so as to effect formation of a substantial proportion of fat crystals prior to contact with the catalyst, these fat crystals will consist mainly of mixed triglycerides such as disaturated-monounsaturated triglycerides, will act as seed and will promote the crystallization of such triglycerides as they are formed on interesterification after contact with catalyst is established, provided, of course, other condiitons are such as to favor the formation and crystallization of such triglycerides. Thus in the interesterification step of the present process the formation of solid high-melting trisaturated glycerides is repressed while a sharp increase in the intermediate melting disaturated-monounsaturated triglyceride content is effected.

After the fatty acid radicals in the oil have been suitably rearranged to insure a substantial proportion of disaturated-monounsaturated triglycerides in the oil and substantially no completely saturated triglycerides, the catalyst is inactivated, and the oil is purified as by water washing and/or alkali refining followed by filtering.

The product of the interesterification is then partially hydrogenated in accordance with known catalytic procedures, for example in the presence of catalytic nickel or nickel-copper at 160 to 170° C. at atmospheric pressure, to a cloud point from about 18 to about 27° C., preferably from about 22 to about 23° C. If desirable, those conditions of hydrogenation conducive to the formation of relatively small amounts of solid isomers of combined oleic acid, i. e. temperatures of the order of 100° C. and pressures of the order of 8 atmospheres may also be employed. The primary purpose of the hydrogenation step is to increase the firmness of the product of interesterification and therefore the manner in which the hydrogenation is conducted is not a limitation of the invention.

After the hydrogenation step is completed, the oil is filtered to remove suspended catalyst, then preferably bleached, deodorized, and filtered. It is then blended and mixed with the customary ingredients employed in converting base stocks into margarine.

Triglyceride mixtures which may be suitably employed in the practice of my invention consist essentially of those vegetable oils of the semi-drying and drying oil classes having saponification values from about 185 to about 200 and iodine values from about 105 to about 140. Thus oils such as cottonseed oil, soybean oil, sunflower seed oil, sesame oil, corn oil and the like find use in the practice of the present invention. Small amounts of other oils, such as coconut oil, palm kernel oil, etc., may be used in admixture therewith to obtain special characteristics if desired.

The following example and detailed description of variations therein will more clearly illustrate the manner in which the invention may be practiced. It is understood, however, that the appended claims are not to be construed as limited to these examples or the appended description.

*Example.*—Refined and filtered cottonseed oil having a saponification value of 195, an iodine value of 110, and a cloud point of −3° C. was chilled to produce a cloud of crystallized triglycerides. To the thus seeded oil was added 0.2% by weight of sodium methoxide in the form of a 10% suspension in xylene, and thoroughly mixed therewith. The mixture was then stored without further agitation at 40° F. and the reaction allowed to proceed for 5 days. At the end of this reaction period the sodium methoxide catalyst was inactivated by incorporating in the mixture slightly more than an equivalent amount of glacial acetic acid. Thereafter the product was water washed, refined and filtered.

As indicated in the body of the specification, the interesterification process as thus practiced favors the formation of a substantial proportion of intermediate melting disaturated-monounsaturated triglycerides. The procedure which has been used to advantage in determining relative proportions of high-melting, intermediate-melting and low-melting triglycerides in mixtures thereof, including those prepared in accordance with the above interesterification reaction, involves dissolving 100 grams of the triglyceride in 400 ml. of a solvent mixture consisting of 93 parts by volume of acetone and 7 parts by volume of ethanol. The solution is stored at 70° F. for 18 hours, during which time it may be occasionally agitated to promote crystallization. Under these conditions a high-melting fraction crystallizes. This crystallized fraction is filtered off and washed with about 100 ml. of solvent mixture at 70° F., then dried and weighed. The combined filtrate and washings are then cooled and stored at 32° F. for 18 hours, an intermediate-melting fraction of the fat being allowed to crystallize. This crystallized fraction is filtered off, washed with 100 ml. of solvent mixture at 32° F., then dried and weighed. The proportion of each fraction of glyceride in the whole fat is readily calculated. This method of determining the relative proportions of high- and intermediate-melting triglycerides is generically referred to hereinafter in the specification and claims as "the method of solvent fractionation."

The results obtained by applying this method of solvent fractionation to the interesterified oil of this example and to a sample of the original oil were as follows:

|  | Cloud Point, °C. | Melting Point, °C. | Solvent Separation | | | |
|---|---|---|---|---|---|---|
|  |  |  | 70° F. | | 32° F. | |
|  |  |  | Per Cent Solid | M. P., °C. | Per Cent Solid | M. P., °C. |
| Original oil | −3.0 | 12.8 | 0 | -------- | 3.8 | 26.0 |
| Interesterified oil | 11.5 | 30.7 | 0 | -------- | 22.8 | 43.0 |

Note.—Capillary melting points given here and elsewhere in the example and specification are determinations made by the American Oil Chemists' Society Capillary Method as of January 1944.

Samples of the thus interesterified oil were then hydrogenated by passing hydrogen gas at substantially atmospheric pressure through the oil at 165° C. in the presence of a suspension of 0.05% (based on the oil) of nickel-copper hydrogenation catalyst. This hydrogenation procedure was continued until the cloud point of the oil was raised to about 22.3° C. At that point hydrogenation was discontinued and the hydrogenated oil filtered, deodorized, and bleached. The product had the following characteristics:

Butyro refractive index at 48° C _____ 46.7
I. V. _____ 68.3
Incipient capillary melting point _____°C__ 26
Complete capillary melting point _____°C__ 40.4

One thousand parts by weight of this processed fat were emulsified with 5 parts by weight of substantially completely hydrogenated cottonseed oil which had been reacted with glycerol to bring the combined glycerol content up to about 14%, one part by weight of soybean phosphatides, and 150 parts by weight of buttermilk. This emulsion was chilled on a refrigerated roll to about 50° F., then passed through an apparatus similar in principle to a food chopper to convert the congealed emulsion into particle form. This product was then blended with 100 parts by weight of buttermilk and 40 parts by weight of salt, and molded into the usual form.

The margarine thus prepared had good eating qualities, and good spreading qualities at icebox temperatures, that is, about 50° F. In comparison with a product prepared from a commercial margarine oil of the same class, the product of this invention was softer and more spreadable at 50° F., enabling the incorporation of coloring matter with greater ease. Even though softer at the lower temperatures, the product was as firm as or firmer than the comparable commercial product at temperatures in the normal range of room temperature such as 70–80° F. Moreover, the improved characteristics are realized without raising the complete melting point above that desirable in a margarine having good eating qualities, i. e. lack of waxiness at body temperature. The improved plastic qualities of my products can advantageously be expressed numerically by means of penetration data obtained in testing the respective products for penetration with the A. S. T. M. grease penetrometer, the higher the penetration value, the softer the product.

|  | ASTM Penetration | | |
|---|---|---|---|
|  | 50° | 60° | 70° |
| Sample: |  |  |  |
| Margarine of this example | 91 | 117 | 132 |
| Margarine from commercial margarine oil of the same class | 67 | 97 | 135 |

Other examples may be given to show the use of the invention in the production of margarine stocks from soybean, sunflower seed, sesame, and corn oils instead of cottonseed oil as covered in the example. Thus advantageous results of my invention may be obtained by substituting one of these other oils or a mixture of two or more thereof for the cottonseed oil in the above example.

Of course the conditions of processing may be modified to adjust for variations in characteristics of the oil, but for the most part the rearrangement procedure should be conducted under conditions which favor the formation of a substantial proportion, such as from 20 per cent to 24 per cent, of disaturated-monounsaturated triglycerides as determined by the method of solvent fractionation given above. The thus interesterified oil may then be hydrogenated under suitable conditions of hydrogenation to a cloud point of 18 to 27°, preferably 22 to 23°. The thus processed oil is emulsified and blended to produce a suitable margarine.

In general, the products of this invention have good eating qualities and are plastic over a wider range of temperatures than products produced in accordance with the usual margarine production methods. More specifically, the present products melt substantially completely at temperatures not substantially higher than body temperature (i. e. are not undesirably waxy when eaten), have excellent spreading qualities at 50° F., and penetrations at 70° F. not substantially over 150 as measured with the A. S. T. M. grease penetrometer. It is to be understood that lack of undesirable waxiness during eating does not necessarily mean that the complete capillary melting point is below body temperature (98.6° F.). Actually some products of the invention have possessed complete melting points as high as 104° F. without being undesirably waxy.

In the interesterification step of the instant process, seeding prior to addition of catalyst may be effected in ways other than by chilling the fat. Thus a slurry of the desired crystallized trigylceride in liquid triglyceride at a suitable temperature may be added to the oil and in many instances such procedure may be more convenient. One method which is practical involves chilling a portion of the fat to be subjected to interesterification, such as one half to three quarters, to a temperature below its cloud point in an apparatus designed for rapid and continuous cooling such as a Votator and then mixing the chilled fat containing mixed triglyceride crystals in a picker box or similar mixing device with the remainder of the fat which is at such a temperature that the mixture will be brought to the desired temperature for the interesterification process. The catalyst is then added and the interesterification is permitted to take place.

Although adding the catalyst to the glyceride mixture containing crystals of the mixed triglyceride such as disaturated-monounsaturated triglyceride is a preferred procedure, it is also possible to add the catalyst to the liquid fat, then chill the mixture promptly before appreciable interesterification can take place so that mixed triglycerides which precipitate on chilling are present at the beginning of the interesterification reaction. In this procedure also the Votator may be advantageously employed.

When it is more desirable to add mixed triglyceride crystals to the glyceride undergoing interesterification rather than develop the crystals by chilling such glyceride, then the crystallized mixture triglycerides may be added before or after, or simultaneously with the addition of the catalyst and rearrangement thereafter conducted at a suitable temperature, but, as pointed out above, it is preferable to add the catalyst and thereafter operate under conditions such that the mixed triglyceride crystals are present at the beginning of the interesterification to influence the course of the reaction, thus effecting maximum conversion of the glyceride during interesterification to mixed triglycerides.

Effective practice of the interesterification step in the present invention does not depend upon the use of any particular catalyst. Any material which will promote the interchange of fatty acid radicals at the low temperatures required for crystallization during interesterification is suitable for use.

The true catalyst for the interesterification may be the product of the reaction of triglycerides or of minor constituents contained therein, such as tocopherols, with the catalytic material added. Whatever may be the true catalyst, it can be shown that substances which are effective in bringing about the interesterification include compounds which include sodium or potassium, for example, combined with practically any material less acidic than phenol. Thus various alkoxides such as sodium potassium, and lithium methoxides, ethoxides, propoxides, and butoxides are suitable, as are alkoxides made from alcoholic compounds in general, such as lauryl alcohol, ethylene glycol, oleic acid monoglyceride and many others. Also, alkoxides in which the cation is the tetra-substituted ammonium radical, such as tetramethyl ammonium methoxide and lauryl benzyl dimethyl ammonium methoxide, show activity in promoting the interesterification reaction. Other substances which may be added to further the interesterification reaction at low temperature are alkali metal organic compounds containing the alkali metal atom directly bound to a carbon atom as in triphenyl methyl sodium or to a nitrogen atom as in potassium pyrrole; finely divided metallic potassium or sodium in xylene; and an anhydrous suspension of potassium hydroxide in a hydrocarbon solvent such as undecane.

Because of the great variety of materials that may be used to form the active catalyst and because the actual structure of the true catalytic material is as yet not accurately known, the catalytic materials are generically referred to in the claims as "low temperature interesterification catalysts."

Amounts of interesterification catalyst equivalent to 0.5 per cent by weight of sodium methoxide based on the weight of the fat may be employed, but there is no particular advantage in employing quantities much in excess of 0.3 per cent. Even small quantities such as 0.03 per cent, if not inactivated by impurities, such as moisture, in the fat, are effective in promoting the rearrangement at low temperature, but I have found that the reaction proceeds at a rather low rate unless at least 0.05 per cent is employed. The preferred range of catalyst usage is the equivalent of from about 0.05 to about 0.5 per cent of sodium methoxide.

The catalysts that are used in practicing the present invention are highly efficient in effecting regrouping of fatty acid radicals in the triglycerides, and for this reason it is preferable to render the catalyst inactive after the desired rearrangement has taken place and before the temperature of the fat is allowed to rise appreciably so that substantially no modification results during subsequent handling of the fat. In order to retain the degree and kind of rearrangement effected at low temperature, it is preferable to treat the mixture containing the catalyst with water or an acid reacting compound such as hydrochloric acid, phosphoric acid, carbonic acid, glacial acetic acid, etc., and thereby inactivate the catalyst before any undesirable reversion or other change in the desired molecular arrangement takes place.

In the use of alkoxide catalysts in the practice of the invention, the usual precautions of having the oil dry and neutral, the catalyst finely divided and well dispersed, and of excluding oxygen and carbon dioxide during the reaction should be observed in order to achieve optimum results.

Since the temperatures at which the oils used in the practice of the present invention can begin to form solid mixed triglycerides are below 120° F., in most cases below 100° F., the temperature at which the interesterification is conducted in accordance with this invention for most practical applications is below such temperature but sufficiently high that a substantial proportion of the fat is liquid and sufficiently low to permit the crystallization from the liquid fat of mixed triglycerides of low solubility such as disaturated-monounsaturated triglycerides formed in the interesterification.

Having thus described my invention, what I claim and desire to secure by Letters Patent is:

1. The process of producing an improved margarine oil which comprises contacting a triglyceride mixture consisting essentially of predominantly unsaturated glyceride oil having an iodine value from about 105 to about 140 and a saponification value from about 185 to about 200 with a low temperature interesterification catalyst and effecting interesterification, triglyceride crystals consisting predominantly of disaturated-monounsaturated glycerides being present in the glyceride oil at substantially the beginning of said interesterification and the temperature during contact with the low temperature interesterification catalyst being below 100° F. and within a range of which the lower limit is the lowest temperature at which a portion of the triglyceride is liquid and the upper limit is the highest temperature at which disaturated-monounsaturated triglycerides can crystallize in the liquid as same are formed during the interesterification, maintaining the temperature of the mixture within said range until a substantial portion of intermediate-melting disaturated-monounsaturated glycerides have been formed, inactivating the catalyst and hydrogenating the resulting triglyceride mixture to a cloud point of about 18° to about 27° C.

2. The process of claim 1 in which the interesterification reaction is continued until the intermediate-melting fraction as determined by the method of solvent fractionation of the specification is from about 20 per cent to about 24 per cent.

3. The process of claim 1 in which the oil is cottonseed oil and the interesterification is continued until the intermediate fraction as determined by the method of solvent fractionation of the specification is from about 20 to about 24 per cent.

4. The process of claim 1 in which the oil is cottonseed oil, the interesterification is continued until the intermediate fraction as determined by the method of solvent fractionation of the specification is from about 20 to about 24 per cent, and the hydrogenation is continued until the cloud point of the oil is about 22–23° C.

5. The process of claim 1 in which the oil is soybean oil and the interesterification is continued until the intermediate fraction as determined by the method of solvent fractionation of the specification is from about 20 to about 24 per cent.

6. The process of claim 1 in which the oil is sunflower seed oil and the interesterification is continued until the intermediate fraction as determined by the method of solvent fractionation of the specification is from about 20 to about 24 per cent.

ANDREW DOYLE ABBOTT.